US005768413A

United States Patent [19]
Levin et al.

[11] Patent Number: 5,768,413
[45] Date of Patent: Jun. 16, 1998

[54] METHOD AND APPARATUS FOR SEGMENTING IMAGES USING STOCHASTICALLY DEFORMABLE CONTOURS

[75] Inventors: David N. Levin, Chicago; Robert P. Grzeszczuk, Oak Park, both of Ill.

[73] Assignee: Arch Development Corp., Chicago, Ill.

[21] Appl. No.: 539,204

[22] Filed: Oct. 4, 1995

[51] Int. Cl.$^6$ ............................................. G06K 9/00
[52] U.S. Cl. .......................................... 382/173; 382/131
[58] Field of Search .................................. 382/176, 177, 382/178, 180, 179, 199, 200, 173, 131, 132

[56] References Cited

U.S. PATENT DOCUMENTS

| | | | |
|---|---|---|---|
| 5,048,095 | 9/1991 | Ghanu et al. | 382/155 |
| 5,247,583 | 9/1993 | Kato et al. | 382/225 |
| 5,390,258 | 2/1995 | Levin | 382/131 |
| 5,568,384 | 10/1996 | Robb et al. | 382/132 |

OTHER PUBLICATIONS

Chang et al., "Constrained Nonlinear Optimization Approaches to Color-Signal Separating" Jan. 1995, pp. 81-94, IEEE Trans. on Image Processing, vol. 4, No. 1.

Lundervold et al., "Segmentation of Brain Parenchyma & Cerebrospinal Fluid in Multispectral Magnetic Resonance Images," Jun. 1995, IEEE Trans. on Medical Imaging vol. 14, No. 2, pp. 339-349.

L.D. Cohen and I. Cohen, "Finite-Element Methods for Active Contour Models and balloons for 2-D and 3-D Images," IEEE Transactions on Pattern Analysis and Machine Intelligence, vol. 15, No. 11, pp. 1131-1147, 1993.

S. Geman and D. Geman, "Stochasitic Relaxation, Gibbs Distributions and the Bayesian Restoration of Images," IEEE Transactions on Pattern Analysis and Machine Intelligence, vol. PAMI-6, No. 6, pp. 721-741, 1984.

N.S. Friedland and A. Rosenfeld, "Compact Object Recognition Using Energy-Function-Based Optimization," IEEE Transactions on Pattern Analysis and Machine Intelligence, vol. 14, No. 7, p. 770-777, 1992.

K.D. Toennies and D. Rueckert, "Image Segmentation by Stochastically Relaxing Contour Fitting," Medical Imaging 1994: Image Processing, Bellingham, WA: Int. Soc. for Opt. Eng., vol. 216, pp. 18-27, 1994.

B.S. Morse, W.A. Barrett, J.K. Udupa, and R.P. Burton, "Trainable Optimal Boundary Finding Using Two-Dimensional Dynamic Programming," University of Pennsylvania Technical Report No. MIPG180, 1991.

D. Geiger and A. Gupta, "Multiscale and 'Two-Loop' Strategies for Speeding Up Segmentation Via Dynamic Programming," Medical Imaging 1994: Image Processing, Bellingham, WA: Int. Soc. for Opt. Eng., vol. 2167, pp. 766-772, 1994.

D. Geiger and A. Gupta, "Detecting and Tracking the Left and Right heart Ventricles Via Dynamic Programming," Siemens Corporate Research, Inc., 755, College Road East, Princeton, NJ 08540.

G. Storvik, "A Bayesian Approach to Dynamic Contours Through Stochastic Sampling and Simulated Annealing," IEEE Transactions on Pattern Analysis and Machine Intelligence, vol. 16, No. 10, pp. 976-986, 1994.

M. Kass, A. Witkin, and D. Terzopoulos, Snakes: Active Contour Modes, Int. J. Of Comput. Vision, pp. 321-331, 1988.

Primary Examiner—Yon Couso
Attorney, Agent, or Firm—Welsh & Katz, Ltd.

[57] ABSTRACT

A method for segmenting an image in which an arbitrarily shaped contour is deformed stochastically until it approximates the contour of a target object. The evolution of the contour is controlled by a simulated annealing process which causes the contour to settle into a global minimum of an image-derived "energy" function. The non-parametric energy function is derived from the statistical properties of previously-segmented training images. High computational complexity is avoided by using an efficient method of introducing a random local perturbation, and assuring the resulting shape changes are unbiased. This method for perturbing the contour allows for execution times several orders of magnitude shorter than in simple implementations.

38 Claims, 8 Drawing Sheets

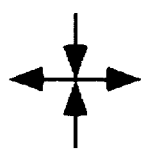
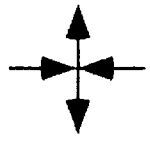
Fig. 1A
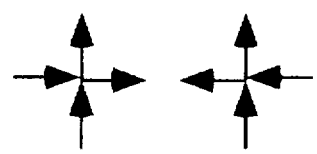
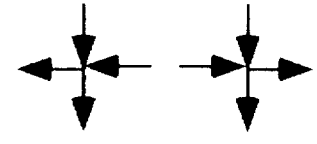
Fig. 1B
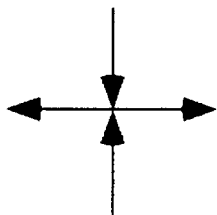
Fig. 2A
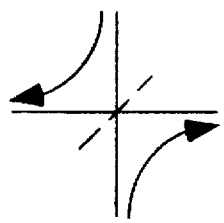
Fig. 2B
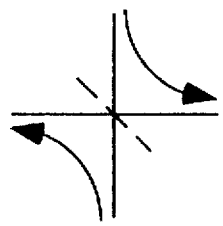
Fig. 2C
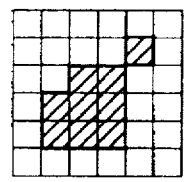
Fig. 3A
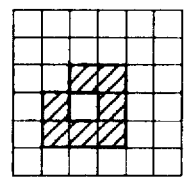
Fig. 3B
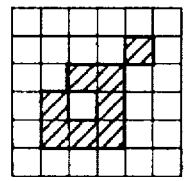
Fig. 3C
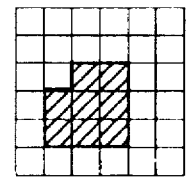
Fig. 3D

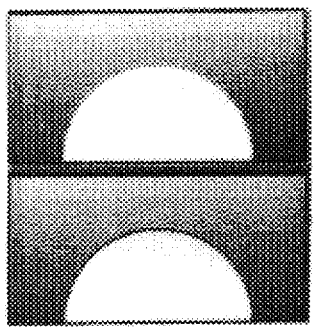 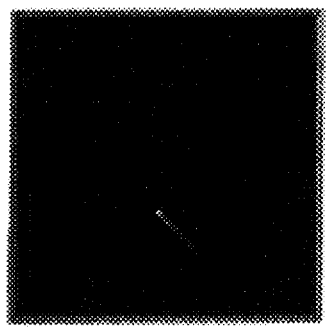 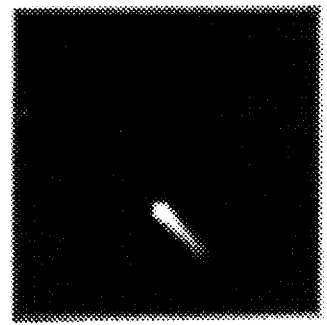

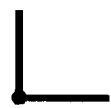
Fig. 7A
Fig. 7B
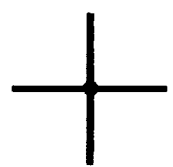
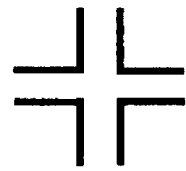
Fig. 7C
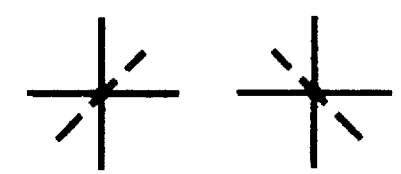
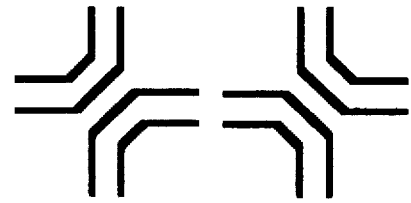
Fig. 7D

METHOD AND APPARATUS FOR SEGMENTING IMAGES USING STOCHASTICALLY DEFORMABLE CONTOURS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates generally to pattern recognition and more specifically to a method and apparatus for segmenting images using stochastically deformable contours which are specifically deformed over time according to image intensity information of a target image.

Image segmentation is an essential component of many image processing, computer graphic, and computer vision techniques. Since manual methods are usually impractical, many investigators have attempted to develop automated segmentation techniques. Most of these schemes start with a pixel classification step, followed by aggregation of similar pixels into regions (region growing). Pixels can be classified by examining a variety of local signal characteristics; for example, methods ranging from simple intensity thresholding to fairly involved multispectral statistical analysis are commonly used for that purpose. Known methods are used to assign pixels to discrete classes or to estimate a pixel's probability of belonging to each class. Usually, a number of pixels will be misclassified due to noise, systematic errors in signal strength due to imaging system imperfections, partial volume averaging, and intrinsic overlap of signal characteristics of two materials. Next, pixels belonging to the same class are typically aggregated into regions by means of a connectivity criterion (adjacency through edges or corners). Because of its local nature, this method of region formation is very sensitive to errors in the pixel classification process. For example, if a single pixel is erroneously assigned to a region, it can cause region growth to "leak" across a gap into a neighboring region with similar characteristics.

Similarly, a spurious gap between region pixels, created by the erroneous assignment of a few pixels to another class, may cause the aggregation process to miss large parts of a structure. Thus, mistakes made at the pixel classification stage may be amplified during region formation. A user must frequently intervene to correct these errors, thereby defeating the attempt to automate the process. Some of the problems of region growing can be ameliorated by using more sophisticated local techniques. For example, some "leaks" can be eliminated by applying binary morphologic operations, effectively making the connectivity criterion somewhat "fuzzy." However, this local improvement is accomplished at the expense of introducing irreversible errors elsewhere in the boundary. In general, it can be argued that any pixel aggregation method based on purely local criteria is likely to be unstable in the face of pixel misclassification errors.

State space search methods are also known and provide an alternative approach to region formation. Instead of assigning a probability of validity to each pixel and then aggregating similar pixels by means of a purely local criterion (connectivity), each region is assigned a probability in an attempt to find the best global description of the structure of interest. Such methods are less likely to be affected by local errors and are more influenced by "gestalt" principles. Furthermore, a typical state space search considers a larger variety of possible region boundaries than does region growing, which only examines isocontours of the probability of region membership. On the other hand, state space techniques must deal with the huge size of the search space, which reflects the large number of possible regions to be evaluated. This leads to high computational complexity and/or need for user feedback.

Known methods have attempted to process images by a "region optimization" technique in which all possible combinations of pixels were considered to be candidate regions. However, this method was not computationally practical due to the huge combinatorial growth in the number of candidate regions, reflecting the "curse of dimensionality."

Other known methods have reduced the complexity of the state space approach by representing regions by 1-D (1-dimensional) boundaries ("snakes") instead of 2-D (2-dimensional) collections of pixels. This made it computationally practical to conduct a search for the optimal region. Each contour configuration was assigned an energy thought to be small when the contour was near the object to be identified. The energy had extrinsic components derived from underlying image characteristics (e.g. edge strength) as well as intrinsic components (e.g. elasticity) which imposed regularity on the curve shape. The dynamical evolution of a snake was deterministic; given an initial state, equations of motion were solved to find its final state. Such a system behaves like an elastic rope which has been placed over an image-derived landscape and is allowed to slide downhill and/or stretch into a mechanically stable configuration.

While a useful tool for interactive applications, the original snake paradigm does not lend itself to automatic image segmentation. First, the evolution of a snake depends sensitively on its initial state because it tends to settle into a local minimum near its initial location in state space. For example, using the "elastic rope" analogy, a small ridge may stop it from rolling all the way down into a deep valley. Repeated user interaction may be required to examine its "resting" position and to re-initialize its evolution if this configuration is unsatisfactory. The method also suffers from the computational complexity of deterministic dynamical systems with many degrees of freedom.

In order to find the optimal contour, one needs to solve the snake's equations of motion. This can be accomplished with finite element methods which convert the partial differential equations into a time-evolving set of linear equations. The resulting matrices are large, and many computational steps may be required to achieve convergence (in a general case, $O(n^2)$ steps of $O(n)$ each). In order to control this complexity, one can limit the number of degrees of freedom in the contour and/or reduce the complexity of the energy. The first strategy limits the possible irregularity of the contour and, thus the accuracy and validity of the solution, whereas the second approach imposes restrictions on the sophistication of segmentation criteria.

Some other known methods involved image segmentation based on a non-deterministic search of state space. For example, methods using a restricted class of contours ("star-shaped" polygons) which were easy to parametrize and deform, were not appropriate for describing realistic biological objects. They also relied on parametric energy functions which had to be "hand tuned" for each application and might not easily encompass complex segmentation criteria.

Other known methods employed an arbitrarily shaped, progressively refined polygon to describe the structure of interest. However, this method required that the optimization procedure be applied at each stage of refinement. The resulting computational complexity required the use of sparse stochastic sampling and heuristic searches instead of robust optimization methods. Furthermore, the energy function was parametric and required specific contrast relationships between the object and the background (e.g. an object uniformly brighter than the background), thus making it unsuitable for many realistic applications.

Another known method used a flexible model (a directed crack-edge graph on the 2-D pixel lattice) and a trainable, non-parametric energy function. However, they used an enumerative optimization technique (dynamic programming), which posed significant restrictions on the shape of the underlying energy function and on the model. For example, they could not use energy functions normalized with respect to contour length (e.g. contour energy equal to the average energy of all cracks), and they had to use curves with fixed end points (making it difficult to deal with closed contours). In addition, the method suffered from computational complexity associated with loop detection and/or convergence.

It is interesting to compare a method by Storvik entitled "A Bayesian Approach to Dynamic Contours Through Stochastic Sampling and Simulated Annealing" published in IEEE Transactions on Pattern Analysis and Machine Intelligence, Vol. 16, No. 10, pp. 976–986, 1994, with the present inventive method. Storvik applied simulated annealing to optimize a boundary modeled by a polygon whose vertices coincided with pixel corners. Moves were made by adding (or deleting) one, two, or three pixels from the region description. Because Storvik had little control over the move size distribution, he had to resort to a slow logarithmic annealing schedule; i.e. he had to use "classical" simulated annealing instead of "fast" simulated annealing. This resulted in a prohibitively slow performance.

For example, Storvik reported that his method required 100,000,000 iterations (or 137 minutes of computation) to identify the ventricular cavity in an ultrasound image and 1,000,000 iterations (or 10 minutes) to identify the brain surface in a single MR image of a head. Furthermore, his energy function was difficult to train on the basis of prior experience since it was a sum of parametric terms which were weighted manually.

Accordingly, it is a object of the present invention to substantially overcome the above-described problems.

It is another object of the present invention to provide a method and apparatus for segmenting images that is automatic without requiring human intervention to adjust parameters with respect to images processed.

It is a further object of the present invention to provide a method and apparatus for segmenting images that uses statistical properties of training images to approximate a contour of a target object.

It is also an object of the present invention to provide a method and apparatus for segmenting images that approximates the contour of a target object in about between 10,000 to 15,000 image deformations in a computationally feasible manner.

It is still an object of the present invention to provide a method and apparatus for segmenting images that uses image intensity information to approximate the contour of a target object using intrinsic and/or extrinsic information.

SUMMARY OF THE INVENTION

The disadvantages of known image segmentation methods are substantially overcome with the present inventive method and apparatus by providing a novel method for image segmentation using stochastically deformable contours. The novel method is based on a stochastic search of the state space of a deformable contour.

Each possible configuration of the contour is assigned an energy which depends on the intensities of nearby pixels and, possibly, on the contour's geometry. This is done with a non-parametric energy function which has been "trained" on previously segmented images so that it is minimized when the contour is around the region of interest. Then, simulated annealing is used to find the lowest energy contour within the image to be segmented. This is done by initializing the contour in a random configuration and then allowing it to evolve in a stochastic fashion.

The system is called a "Brownian string" since the contour's movements resemble the Brownian motion of a string in thermal equilibrium with a slowly cooling bath. The string moves over an image-derived landscape with a series of thermal movements, involving downhill traversal as well as some hill-climbing. As the temperature of the system is slowly reduced, the string "cools" and then "freezes" in the minimum energy configuration along the valleys of the image-derived energy landscape.

An important advantage of the present inventive method is that it automatically finds a global or nearly global minimum of the energy, no matter what contour configuration is used to initialize the process, thus requiring little or no user interaction. Secondly, the method is computationally simple; specifically, its complexity is linear in the number of contour elements since local calculations can be used for all operations (e.g. contour deformations, computation of energy changes, etc.). This makes it practical to manipulate long, arbitrarily irregular contours in which every inter-pixel "crack" is treated as an independent degree of freedom. Furthermore, it is computationally feasible to utilize complex, non-parametric energy functions which can be directly derived from prior experience (e.g. similar images which have been previously segmented). Thus, it is not necessary to restrict the number of degrees of freedom of the contour, nor are there strict limits on the complexity of "forces."

Image segmentation often requires the identification of object borders which are not entirely well-defined. Only fragments of a boundary may be depicted because of image errors (e.g. noise) or because of low contrast between the object of interest (target object) and adjacent objects. Such an incompletely imaged border may be inaccurately identified by local image analysis (e.g. region growing) since this technique tends to "leak" through apparent defects in it. However, such a boundary may be accurately defined by searching for the "best" way for a contour to cross the problematical zone. This can be done by assigning a global estimate of validity (an "energy") to each possible configuration of the boundary of the object, thus reducing segmentation to the optimization problem of finding the contour with the lowest energy.

The present inventive method addresses this problem. Contour optimization was performed with a stochastic algorithm (simulated annealing) which was statistically guaranteed to find the best contour in the search space. Thus, the method rejected contours which represented local minima in the search space. Because simulated annealing involves only simple calculations (energy differences resulting from local perturbations), it was computationally practical to apply it to complex contours. Specifically, every inter-pixel crack represented an independent degree of freedom so that arbitrarily irregular contours could be considered.

Furthermore, because of the non-analytic nature of the annealing procedure, it was easy to introduce complex higher level knowledge (e.g. anatomical templates) that restricted the search space and hastened the annealing process. This made the method suitable for refining the approximate object boundaries found by other segmentation schemes (e.g. region growing followed by morphological transformations). It was also straight-forward to use non-analytic (non-parametric) energy functions, containing terms dependent on both extrinsic data (i.e. image data) and intrinsic properties of the contour (i.e. contour geometry).

A "training" procedure was used to determine the shape of the energy function from the statistical properties of similar object boundaries in already-segmented images. Thus, the energy function was derived directly from prior experience without restricting it to a special parametric form or "tuning" any parameters. An important technical component of the inventive method was the "move" generator, which deformed the contour locally. The method includes two alternative ways to generate such deformations in computational times which were proportional to the size of the deformation. Since the time for move generation was independent of the total contour length, it was practical to anneal long, detailed contours.

The inventive method has clear advantages over the use of snakes, which evolve according to equations of motion. Such deterministic systems tend to become trapped in local minima and have to be reinitialized manually in order to reach more optimal configurations. Furthermore, the snake equations of motion are so complex that the computation must be simplified by considering only smooth, coarse interpolants with a small number of degrees of freedom. Finally, it may be difficult to use non-analytic forms of higher level knowledge to simplify such an explicit system of equations.

More specifically, the method by segmenting images for identifying the boundary of a target object where the boundary has a contour, includes the steps of: (a) selecting a plurality of training objects with contours having predetermined statistical properties in common with predetermined statistical properties of the contour of the target object; (b) placing each training object in a position to be scanned by an imaging system; (c) scanning each of the training objects to obtain the predetermined statistical properties of the contours of the training objects; (d) deriving an energy function from the predetermined statistical properties of the contours of the training objects; (e) selecting a target object to be scanned and placing the target object in a position to be scanned by the imaging system; (f) creating an evolving contour having an initial topology similar to a topology of the target object; (g) calculating a value of the energy function of the evolving contour in a neighborhood of the target object, utilizing the predetermined statistical properties of the evolving contour; (h) deforming the evolving contour by applying a deformation generator; (i) calculating a value of the energy function of the evolving contour utilizing the predetermined statistical properties of the evolving contour in the neighborhood of the target object after the evolving contour has been deformed, where the energy function has a low energy value when the statistical properties of the evolving contour are similar to the statistical properties of the contour of the training object, and the energy function has a high energy value when the statistical properties of the evolving contour are not similar to the statistical properties of the contour of the training object; (j) comparing the value of the energy function of the evolving contour before and after the evolving contour has been deformed, respectively; (k) accepting the deformations of the evolving contour if the value of the energy function after deformation is lower than the value of the energy function before deformation; (l) determining whether to accept or reject the deformations of the evolving contour if the value of the energy function after deformation is not lower than the value of the energy function before deformation, where rejection of the deformations causes the deformations not to be merged into the evolving contour; (m) merging said accepted deformations into the evolving contour; (n) repeating steps (h)-(m) until less than a predetermined fraction of a predetermined number of deformations generated by the deformation generator are accepted; and (o) using the evolving contour to identify the boundary of the target object.

BRIEF DESCRIPTION OF THE DRAWINGS

The features of the present invention which are believed to be novel are set forth with particularity in the appended claims. The invention, together with further objects and advantages thereof, may best be understood by reference to the following description in conjunction with the accompanying drawings.

FIG. 1a is a pictorial illustration representing the only admissible four-valent vertices which can occur in a crack diagram representing a Jordan curve;

FIG. 1b is a pictorial illustration representing four-valent vertices which cannot occur in a crack diagram representing a Jordan curve;

FIG. 2a is a pictorial illustration representing a vertex of a crack diagram;

FIGS. 2b-2c are pictorial illustrations showing how the vertex of FIG. 1a can be traversed in two possible ways where each traversal rule is equivalent to pairing the edges and can be symbolically represented as a diagonal line;

FIG. 3a is a pictorial illustration of a crack diagram representing an 8-connected region with a 4-connected background;

FIG. 3b is a pictorial illustration of a crack diagram representing a 4-connected region with an 8-connected background;

FIG. 3c is a pictorial illustration of a crack diagram representing an 8-connected region with an 8-connected background;

FIG. 3d is a pictorial illustration of a crack diagram representing a 4-connected region with a 4-connected background;

FIG. 4a pictorially represents an image of a simple test pattern devised to demonstrate the basic aspects of the present inventive method showing a semicircle and a background having oppositely directed vertical intensity gradients, as shown in the upper panel. The lower panel pictorially represents an image of a training contour having a target edge used to train an energy function;

FIG. 4b is a pictorial representation of an image of a histogram of cracks shown in the training contour of FIG. 4a, showing the number of cracks adjacent to inside (abscissa) and outside (ordinate) pixels having various intensities;

FIG. 4c pictorially represents an image of a probability density function estimated by convolving the histogram shown in FIG. 4b with a rectangular Parzen window;

FIG. 6c pictorially illustrates a method of following the outside wall of the contour shown in FIG. 6a;

FIG. 6d pictorially illustrates a method of following the inside wall of the bike trail contour shown in FIG. 6a;

FIGS. 7a–7b pictorially illustrates rules for connecting walls around two-valent and three-valent vertices;

FIG. 7c pictorially illustrates a rule for connecting walls around four-valent vertices which do not appear in an unperturbed cracked diagram;

FIG. 7d pictorially illustrates rules for connecting walls across four-valent vertices which were present in an unperturbed crack diagram so that they follow traversal rules of the unperturbed contour;

FIG. 8a pictorially represents an image shown in its initial state;

FIGS. 8b–8c pictorially represent images shown in their melted phase;

FIGS. 8d–8e pictorially represent images shown in their cooled phase;

FIG. 8f pictorially represents images shown in their final frozen configuration;

FIG. 8g pictorially represents an image showing the portion of the field of view covered by the contour throughout its evolution;

FIG. 10a pictorially represents an MR image of a human head showing a single, midline slice used to form training contours to generate a non-parametric energy function for segmenting all other slices;

FIG. 10b pictorially represents an image of a histogram of the cracks in the training contour shown in FIG. 10a;

FIG. 10c pictorially represents an image of a Parzen-estimated probability density function derived from the histogram shown in FIG. 10;

FIG. 10d pictorially represents an image of the final energy function, augmented with heuristic components favoring stronger gradients and pushing the contour away from energy plateaus where a brighter intensity signifies a lower energy level;

DETAILED DESCRIPTION OF THE INVENTION

Figure 5:
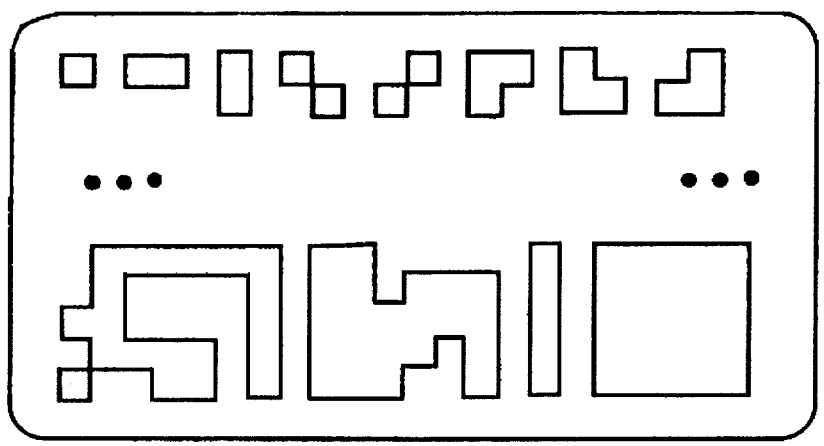
FIG. 5 is a pictorial illustration of loops used to generate contour deformations used in a bike trail deformation generator.

In most applications it is desirable to find the boundary of a 2-D region (e.g. the brain in an MR head image), which could be represented as a closed curve. Alternatively, depending on the application, it is desirable to look for an open curve which described a linear structure, such as when segmenting a blood vessel in an angiographic image. In either case, it was desirable to consider arbitrarily irregular curves during the search for the optimal contour. For example, this type of unrestricted search was necessary in order to find a contour which accurately described the highly convoluted surface of the brain.

Referring now to FIGS. 1a–1b, 2a–2c and 3a–3b, crack edges are used to represent the contour because of their ability to represent such arbitrarily shaped curves, their topologically good behavior, and the ease with which split-merge operations could be performed using computer systems. These properties made it possible to traverse and deform the contour repeatedly in an efficient manner during the annealing process, thus making the approach computationally tractable, as will be described in greater detail hereafter. Cracks may be the common edge between adjacent pixels.

At various points in the computation, two complementary data structures were used to represent the cracks comprising a curve or contour. One of the data structures used was the traditional crack-edge chain code in which coordinates of the starting vertex were stored, followed by a 1-D sequence of directional codes (RIGHT, UP, LEFT, or DOWN). This representation was compact, yet fairly flexible, allowing for representation of arbitrarily connected regions. Curves that do not describe regions (e.g., self-intersecting contours or open curves) could also be modeled in this way. The crack chain was an implicit representation of the curve, allowing for fast contour "traversal" (i.e., sequential enumeration of all (x, y) vertex coordinates along the curve).

The second data structure commonly used in the inventive method was a crack diagram shown in FIGS. 3a–3d which represent the curve as a directed graph of pixel edges on a rectangular grid. The diagram was implemented as a simple crack-edge occupancy array: each crack between pixels could hold at most one edge element. Consequently, no oppositely oriented edges (e.g., UP and DOWN) could share a crack, and no parallel edges (e.g., UP and UP) could overlap. The graph thus created was at most 4-valent: no more than 4 edges ever met at a vertex. The crack diagram was an explicit description of a curve allowing for split/merge-type operations and rapid identification of intersections between contours. These two representations provided equivalent descriptions of the non-intersecting curves which populated the search space. Any simple curve in the chain-code form could be expressed in a crack array representation and vice versa; e.g. any 2-D crack array representing a simple curve could be "traversed" and converted into a chain code in linear time.

Because of their complementary properties, these two contour representations may be used simultaneously. For example, it could be determined in constant time whether a specific crack was present in a contour in the crack array format. Consequently, given two curves, their intersections could be found in time proportional to the length of the shorter curve by traversing that contour in the chain-code format and comparing the pixel coordinates to the crack array representation of the longer one.

In most applications, the contour was expected to be the digitized version of a simple closed loop which could be traversed without interruptions, self-intersections, or retraversals of any segment; i.e. it was expected to be a Jordan curve which divided the plane into two components (an inside "region" and an outside "background") . It can be proved rigorously that a crack diagram has these properties if and only if it is composed of two-valent vertices and the four-valent vertices, as shown in FIG. 1a. Notice that these diagrams do not contain the vertices shown in FIG. 1b, which always describe a self-intersecting contour. Therefore, the set of all such "Jordan crack diagrams" is used as the state space.

These diagrams can be classified according to the rules used to traverse their four-valent vertices: 1) if the traversal rule in FIG. 2b is used exclusively, the region is 8-connected and the background is 4-connected, as shown in FIG. 3a; 2) if the traversal rule in FIG. 2c is used exclusively, the region is 4-connected and the background in 8-connected, as shown in FIG. 3b; 3) if the traversal involves a mixture of FIGS. 2b and 2c, the region and the background are both 8-connected, as shown in FIG. 3c. If the contour has no 4-valent vertices, both the region and the background are 4-connected, as shown in FIG. 3d.

In other words, a region is 8-connected if in order to connect at least one pair of pixels of the region by a path within the region, it is necessary to cross a vertex. A 4-connected region implies that every pair of pixels within the region can be connected by a path within the region which does not cross any vertex. Similarly, the definition for 8-connected backgrounds and 4-connected backgrounds are analogous with respect to crossing either corners or edges of the pixels. Thus, four conditions exist describing pixel arrangements, as shown in FIGS. 3a–3d.

As described herein, the present inventive method can find the optimal contour in any of these subspaces of the state space of Jordan curves, if that is required by a specific application. There are several reasons for the above concern about single-pixel-wide connections. Realistic final regions may not contain such fine details, or they may not be of interest. However, the intermediate stages of the method often involve single pixel connections which require methodical treatment in order to guarantee topological consistency. More importantly, some types of connectivity (e.g. type 3 above) are more suitable for efficient search space exploration than others (e.g. 4-connected regions and 4-connected backgrounds), thereby permitting more rapid convergence.

Each contour in the search space was assigned an energy which depended on the global characteristics of that contour. Note that the term "energy" as used hereinafter, is used analogously and does not represent an actual quantity of energy, such as a Joule or an Erg. An energy function was derived which determined the probability that each contour would be chosen to be the boundary of the region or target object to be segmented.

The form of the energy function derived allowed its value to be determined when the value of its arguments was known. Such an energy function could be parametric in nature, such as a quadratic, cubic, or quintic equation and the like, or the value could be obtained from a look-up table, as is known in the art.

Since the validity of each contour was determined by this global property, the method was relatively insensitive to erroneous signals in individual pixels. Two types of energy terms could be considered: 1) extrinsic energy which is related to the intensities of image pixels near the contour; 2) intrinsic energy which is determined by purely geometric characteristics of the contour, such as tortuosity, circularity, length, or area. In the inventive method, preferably extrinsic energy is assigned to each crack and equated the energy of the whole contour to the average energy of all cracks in the contour. The energy of each crack was a function of local image features (e.g. average intensity, gradient, texture, etc).

Although purely parametric energy functions were used experimentally, it was found that such explicit expressions were too limited to embody complex segmentation criteria. The parametric approach also required that the user "tune" the free parameters of the energy function for each application. Instead, the preferred method "trains" a non-parametric energy function on the statistical description of similar region boundaries in previously-segmented images.

Referring now to FIGS. 4a–4c, first, a 2-D histogram of the intensities of pixels on either side of the cracks was made in the "training" contour. This histogram was convolved with a rectangular Parzen window and normalized to create a continuous function which approximated the probability density (p) of finding a "training" crack with any intensity and gradient values, as shown in FIG. 4c. Different estimates of probability density functions could be created by using other methods such as a nearest-neighbor analysis; the Parzen method was chosen for efficiency and ease of implementation. During an annealing process, as will be described in greater detail hereafter, each contour crack was assigned an energy proportional to 1-p where p was the probability of finding a similar crack in the training contour.

In other words, a crack was assigned low energy if similar cracks were found frequently in the training contour. Conversely, a crack was assigned high energy if similar cracks were found rarely in the training contour. Prior to annealing, the energies of all cracks in the image were pre-computed and stored in a 2-D array. Then, during the annealing process, the contour's energy could be computed efficiently by using this look-up table to find the average energy of all of its cracks.

Training objects are selected which have contours having similar predetermined statistical properties, such as pixel image intensities, in common with predetermined statistical properties of the target object. Such pixels of the training object or of the target object may be immediately adjacent either side of the boundary of the object. In other words, the pixels may be disposed immediately inside the contour or boundary of the object or may be disposed immediately outside the contour or boundary of the object.

Alternatively, the pixels need not be immediately adjacent to the boundary. Rather, the pixels may be disposed within a neighborhood near the contour or boundary of the object. For example, the pixels may be disposed within a predetermined pixel distance, such as a ten pixel distance from the boundary of the object. Such pixels are used in constructing the histograms which represent the predetermined statistical properties of the training objects or the target object.

Note, that pixel image intensity is not the only predetermined statistical property that can be represented in the histogram. Any intrinsic or extrinsic parameters can be represented in the histograms where each additional parameter simply adds another axis to the histogram.

A "move generator" or deformation generator is used to produce a new state (i.e. a new, slightly perturbed contour configuration, referred to as an evolving contour). It must satisfy several stringent requirements. First, all deformations must lead to curves with the required topology. For example, a candidate brain contour must be closed and must not intersect itself. This requirement guarantees that the simulated annealing process will not "waste time" by visiting contour configurations outside the state space and that the process will never terminate at such an inadmissible contour.

As previously noted, in some applications it may be desirable to consider only those deformations which preserve a specific connectivity, property: e.g. 8-connectivity or 4-connectivity, as illustrated in FIGS. 3a–3d. Secondly, the move generator has to be ergodic; i.e. it must be possible to find a series of moves which will deform any curve in the search space into any other curve. This guarantees that the simulated annealing process can visit all parts of the state space in order to find a global minimum or nearly global minimum of the energy. Thirdly, the "move generator" should provide a mechanism for the user to control the general size and shape of the deformations. This makes it possible to increase the efficiency of the annealing process by using a spectrum of moves which is appropriate for each "temperature" level. The term "temperature" is again used analogously and does not refer to actual temperature, such as degrees Kelvin.

The move generator is an important feature that allows a decrease in execution time by several orders of magnitude. For example, annealing occurs in thousands of moves (seconds of computation time) instead of several hundred million moves (hours of computation time) required by other known methods which added and deleted one pixel per move.

Finally, it is essential for deformations to be generated in "constant time" (i.e. in times independent of the contour length) so that the computational burden does not grow rapidly with contour length. A "raindrop move generator" and a "bike trail move generator", as will be described hereinafter, are two such move generators using techniques satisfying the above-described criteria. In each case, the new contour (evolving contour) is generated from the previous contour via a local perturbation which consists of selecting a segment of the contour and replacing it with a different segment in a way that assures that no self-intersections are formed in the process.

"Raindrop" move generator

The "raindrop" method using the raindrop move generator produced a local contour deformation in time proportional to the area of the perturbation by merging the evolving contour with a collection of one-pixel deformations. First, a contour crack was chosen randomly from the crack diagram and used to define the center of a rectangular bounding box, which intersected the contour at two or more points. However, any suitably shaped bounding area may be used. These intersection points were determined by traversing the bounding box and recording all intersections. The points at which the contour first entered and last exited the bounding box determined the Start and End points of the contour segment to be deformed. These points were found by selecting one of the intersection points at random and traversing the contour in the crack diagram representation in both directions simultaneously until all of the intersection points were encountered. Notice that these end points defined a contour segment which could leave and then re-enter the bounding box.

Next, a series of "raindrops" (contours around tiny one pixel regions) were deposited or allowed to "fall" at random locations within the bounding box. Each deposited pixel was represented as its deposited bounding cracks within the crack diagram (four bounding cracks). The raindrops were allowed to fall using the following rules for governing the crack diagram: 1) Two oppositely directed cracks at the same edge location (e.g. an UP crack and a DOWN crack) canceled each other out; 2) Two identically directed cracks could not share the same edge location, thus such a raindrop was not permitted to fall; 3) No inadmissible four-valent vertices (FIG. 1b) were allowed since such crack diagrams did not describe a Jordan curve and all such raindrops were again, not permitted to fall. All closed curves with a counter-clockwise orientation were called "regions", and those with a clockwise orientation were termed "holes".

Within any particular move, or depositing the series of "raindrops", all of the raindrops could be assigned either a clockwise direction or a counter-clockwise direction. Alternatively, a portion of the raindrops could be assigned a clockwise direction and the remainder of the raindrops could be assigned a counter-clockwise direction. In any single move, for example, one to six hundred single pixels or cracks may be deposited.

With these conventions, two externally adjacent regions or externally adjacent holes merged with each other by cancellation of the corresponding cracks in the crack diagram. Similarly, a region merged with an internally adjacent hole to produce an indentation of the region, while a hole merged with an internally adjacent region to produce an indentation in the hole. This meant that contiguous droplets of the same type coalesced into larger oriented contours ("puddles"). Likewise, a droplet or puddle, which was contiguous with the exterior of a puddle or original contour segment (evolving contour) with the same orientation, merged with that structure, causing it to grow. On the other hand, if a droplet or puddle touched the interior of an oppositely oriented puddle or contour segment, it produced an indentation of that structure. The crack diagram produced by this process always contained an admissible deformation of the original contour segment (evolving contour).

To see this, recall that prior to the rain, the crack diagram described a Jordan curve; i.e. it contained only valid vertices (FIG. 1a). Since the rain process did not introduce inadmissible vertices, the post-rain crack diagram contained only valid vertices. Therefore, the portion of the post-rain crack diagram connected to the original contour (evolving contour) contained only valid vertices and described a Jordan curve which could be traversed without interruptions, self-intersections, or retraversals of any segment.

Once the "rain" stopped, the perturbed segment, or a portion of the evolving contour was found by traversing the cracks from Start to End and recording their locations in a chain code. If the search was confined to the portion of state space consisting of curves with 8-connected regions, then all four-valent vertices were traversed in the manner of FIG. 2b. Similarly, if the search was confined to the portion of a state space consisting of curves with 4-connected regions, then all four-valent vertices were traversed in the manner of FIG. 2c. If curves of any type were considered (FIGS. 3a–d), then the four-valent vertices were traversed according to any mixture of these two rules. In order to eliminate disconnected regions and holes that may have formed in the process, two actions were taken.

First, the initial contour segment defined between Start ΔEnd was erased. This assured that disconnected contour segments outside of the bounding box were eliminated. Second, all cracks inside the bounding box were completely cleared, thereby liquidating disconnected puddles inside. In the final stage of the process, the newly formed contour segment Start ΔEnd was entered into the crack diagram.

The raindrop move generator satisfied all of the above-described requirements for a move generator. First, it was guaranteed to generate non-self-intersecting curve segments connecting the end-points of the segment to be replaced. Secondly, the system was clearly ergodic, as any region could be built up from a sequence of single-pixel merges and cancellations. Furthermore, the size and direction of the perturbation were easily controlled by adjusting the dimensions of the bounding box, the amount of "precipitation" or pixels allowed to fall, and the relative numbers of droplets with different orientations. Finally, the overall complexity of the method was reasonable since it was linear in terms of the area of the bounding box, or nearly constant in terms of the original contour (evolving contour) length.

"Bike trail" move generator

The bike trail move generator produced admissible contour deformations by combining the contour to be deformed with small collections of connected, unoriented cracks. Prior to the optimization process, a large variety of these collections called "loops" or perturbative crack arrays were computed and stored in a "library." Such arrays are referred to as "perturbative" since these arrays cause perturbations or deformations in the evolving contour. Each crack in the perturbative crack array is connected to any other crack in the array by at least two different paths such that severing any one crack does not divide the array into two disconnected sets of cracks.

In most cases, loops were used that were generated by aggregating droplets into small closed contours. However, any connected crack diagram, such as those shown in FIG. 5 could be used as a loop, as long as it could not be cut into two pieces by severing a single crack. To generate a move, a single point along the original contour (evolving contour) was randomly selected. Then, a loop (or several superimposed loops) was randomly selected from the precomputed library, and it was centered on this contour point. Next, the intersections between the original contour (evolving contour) and the loop were found by traversing the loop in a manner analogous to the traversal of the bounding box in the previously described raindrop method.

The end points of the contour segment to be deformed (i.e., Start and End ) were identified by starting at any one of these intersection points and traversing the contour in both directions simultaneously until all intersections were encountered. The objective was to generate a sequence of oriented cracks which extended from Start to End, which did not self-intersect or retraverse itself, and which did not intersect or traverse the complementary contour segment End ΔStart. This guaranteed that the entire crack diagram (the new configuration of Start ΔEnd together with the unperturbed segment End ΔStart) represented a Jordan curve.

Figure 6A:
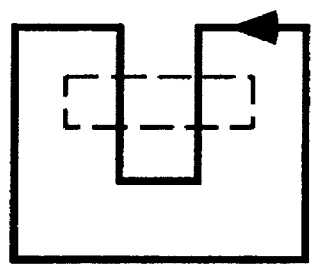
FIG. 6a pictorially illustrates deformations generated by combining a small loop shown as a dotted line with a contour shown as a solid line.

First, a logical OR operation was used to combine the loop and the original contour or evolving contour into a single array of unoriented cracks, as shown in FIG. 6a. Then, the following procedure was used to generate a sequence of cracks extending from Start to End. 1) Beginning at Start, the combined crack array was traversed along a path which turned right at all three-valent vertices and at those four-valent vertices which were not present in the unperturbed contour. 2) When a four-valent vertex of the original contour (evolving contour) was encountered, traversal rules for that contour were used.

Figure 6B:
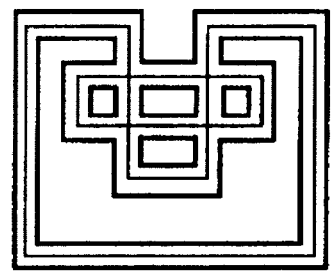
FIG. 6b pictorially illustrates thickening of cracks used to create walls of a bike trail shown as thick lines.
Figure 6C:
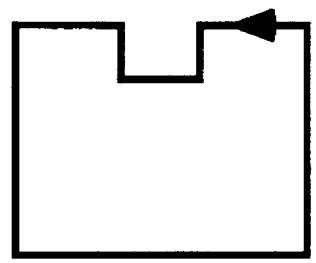

As outlined in the following paragraph, these steps always generated a sequence of cracks which reached End, which did not intersect or retraverse itself, and which did not intersect or traverse End ΔStart. 3) Once End was reached, the perturbed contour was formed by combining the new configuration of StartΔEnd with the unperturbed description of End ΔStart; unused pieces of the loop and the original contour segment (evolving contour) Start ΔEnd were eliminated. This procedure generated perturbed contour segments which skirted the outside of the combined crack array and, therefore, expanded the original contour (evolving contour) as shown in FIG. 6c.

Figure 6D:
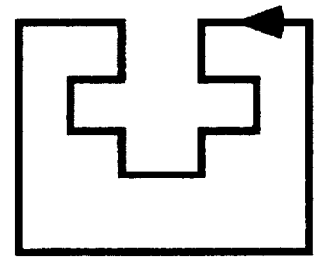

Alternatively, an indentation of the original contour (evolving contour) could be produced by simply bearing to the left in step 1 as shown in FIG. 6d. By randomizing this choice (i.e. randomly bearing to the right or left in step 1), the contour evolved without being biased toward expansion or indentation. Notice that all of the described operations were accomplished in a time proportional to the summed lengths of the loop and the contour segment to be replaced.

The following considerations show why rules 1 and 2 always generated a valid configuration for the segment Start ΔEnd. First, consider the array of unoriented cracks formed by combining the loop and the original contour (evolving contour). Convert the crack array into a maze of "bike trails" by "building walls" on each side of these cracks and connecting the walls according to the rules given in FIG. 7. The walls of these trails are simple closed loops (Jordan curves) which do not touch one another as shown in FIG. 6b.

Furthermore, it can be proved that the two walls adjacent to each crack are not connected; this is a consequence of the fact that the combined crack array cannot be divided into two disconnected portions by severing a single crack. FIG. 7 implies that, beginning at the outside point at End and following the wall in the direction of the original contour (evolving contour), the outside point will be reached at Start by a path skirting the original contour segment (evolving contour) End ΔStart. Similarly, FIG. 7 implies that beginning at the inside point at End and following the wall in the direction of the original contour (evolving contour), the inside point will be reached at Start at a path skirting the original contour segment (evolving contour) End ΔStart. Because the wall is a Jordan curve, the path will return to End if we continue to follow the wall in the same direction after reaching Start. This proves that this wall extends from the outside point at Start to the outside point at End. This also proves that the wall extends from the inside point at Start to the inside point at End.

The sequence of cracks adjacent to this wall segment does not retraverse itself nor does it traverse any crack in the original contour segment (evolving contour) End ΔStart since the two walls adjacent to each crack are unconnected. Furthermore, it is clear from FIG. 7 that this sequence of cracks does not intersect itself nor does it intersect the original contour segment (evolving contour) End ΔStart. This proves that a valid deformation of Start ΔEnd is always generated by beginning at Start and following the outside or inside wall.

Since the rules for following the outside wall are equivalent to the right-handed rules in the previous paragraph, the latter procedure must also generate valid deformations. Similarly, the rules for following the inside wall are equivalent to the left-handed rules described above. If it was desired to consider only those contours describing 8-connected regions, the new segment Start ΔEnd was traversed using the rule illustrated in FIG. 2b, exclusively. Similarly, if it was desired to consider only those contours describing 4-connected regions, the new segment Start ΔEnd was traversed using the rule illustrated in FIG. 2c, exclusively. This had the effect of "snipping" off undesirable portions of the background (region) which were 8-connected.

Therefore, the bike trail move generator or deformation generator always generated an admissible deformation of the original contour (evolving contour), and it was ergodic as long as the pre-computed collection of loops contained single pixel loops. The general size of the deformations was controlled by using an appropriate collection of pre-computed loops sorted by length. The direction of deformation (i.e., region growth or shrinkage) was controlled by choosing the right-handed or left-handed version of the above rules.

Finally, the computational complexity of the method was linear in the perturbation length and nearly constant with respect to overall contour length since it only involved traversals of the loop and the affected contour segment. The bike trail move generator outperformed the raindrop move generator by a factor of three since large pre-computed loops could be used to make perturbations, without the repeated aggregation of single pixel raindrops.

Simulated annealing

In the above formulation, image segmentation was reduced to the optimization problem of finding the lowest energy contour; i.e. the problem of finding the global minimum of the energy function over the state space of all possible contours. It was disadvantageous to use a purely "downhill" minimization procedure, which would become trapped in the local minima of the energy function. Instead, simulated annealing was employed since it was guaranteed to find the global minimum (or a nearly global minimum) and since its computational cost grew much less rapidly than the size of the search space.

As described above, the evolving contour was initialized in a randomly selected configuration and then allowed to evolve through a stochastic series of local perturbations, selected by either the raindrop move generator or the bike trial move generator. Deformations that lowered the system's energy were always accepted (i.e. defined the next state of the system), thus providing for consistent "downhill" behavior. In addition, occasional "uphill" moves were also accepted in order to prevent the system from getting stuck in local minima.

Figure 8A:
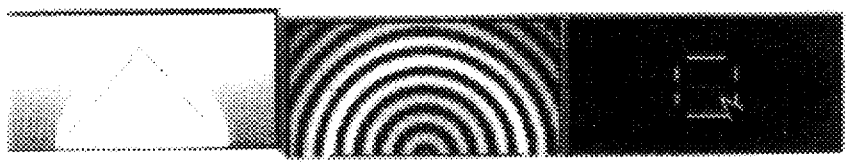
FIGS. 8a–8g pictorially represents images of the evolution of a Brownian string through "melted", "cooled" and "frozen" phases, where a left column depicts the identification of the semi circle shown in FIG. 4a, the center column depicts the identification of a bright ring in the presence of other rings of lesser intensity which create many local energy minima, and the right column depicts identification of a box having missing and extraneous edges.
Figure 8B:
Figure 8C:
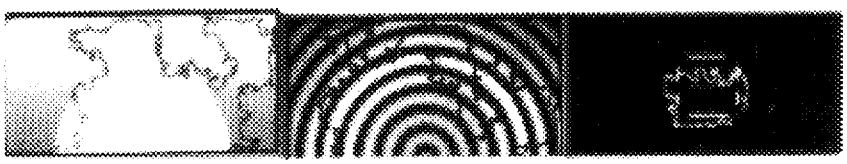

The probability of an uphill transition was given by the Boltzmann factor, $e^{-\Delta E/T}$, where T is the user-controlled "temperature" of the system and ΔE represents the change in energy of the system. The temperature was initially raised until a significant fraction (e.g. preferably greater than 80%) of uphill moves were accepted. However, any suitable percentage of uphill move acceptance may be used. For example, a suitable initial temperature may cause about between 65% to 95% of the uphill moves to be accepted. With the contour in this "melted" condition, the state space was explored in a nearly unconstrained fashion which involved frequent changes in the large scale architecture of the evolving contour, as shown in FIGS. 8b and 8c.

Figure 8D:
Figure 8E:
Figure 8F:
Figure 8G:

After a large number of moves were evaluated at a given temperature, the temperature was decreased by a modest amount, and the process was repeated at the lower temperature. At lower temperatures, uphill moves were less likely to be accepted, and the "cooling" contour tended to dwell in low energy regions of the state space, as shown in FIGS. 8d and 8e. If enough moves were evaluated at each temperature and if the temperature was lowered slowly enough, the system remained in "thermal equilibrium;" i.e. the probability of finding the contour in a given state was proportional to the Boltzmann factor. Therefore, the cooling system tended to converge to the global energy minimum just as an annealing liquid tends to "freeze" in the "crystalline ground" state in FIG. 8f. In practice, the system was deemed to be "frozen" when only a small fraction for example, less than about 0.5% of attempted moves was accepted. However, any suitable percentage of accepted moves may be used. For example, a suitable final temperature may cause about less than 5.0% of the moves to be accepted, indicating a "frozen" state. Essentially, the selected temperature controls the probability that a particular deformation or move was accepted.

In order to get good results with simulated annealing, attention must be paid to the annealing "schedule": i.e. the rate at which the temperature is lowered. If the temperature is lowered too rapidly, the system may not remain in thermal equilibrium. Such a "quenched" system may converge to a local minimum. In formulations of simulated annealing, the moves were selected from a uniform size distribution; i.e. all moves in an allowable size range were equally probable. In this case, it can be shown that the temperature must be lowered at a very slow (logarithmic) rate in order to maintain thermal equilibrium. The temperature can be lowered more rapidly (e.g. exponentially) if moves are selected from a Cauchy-like size distribution. In this "fast" form of simulated annealing, the tail of the Cauchy distribution generates just enough large moves to guarantee that the system will be able to escape from local minima. Further time savings can be realized by lowering the peak of the Cauchy distribution as temperature is decreased. This avoids the generation of too many large moves which are unlikely to be accepted at low temperatures. In most applications this "fast" simulated annealing approach was preferable so that the temperature could be confidently decreased by a certain fixed percentage at each step.

TEST RESULTS

The first three examples (Examples A–C) of the six following examples each demonstrate: 1) the general characteristics of the inventive method; 2) its ability to find the globally optimal (or nearly optimal) contour in the presence of many local minima; 3) its stability in the presence of noise and other image errors. The last three examples (Examples D–F) show how Brownian strings can be used to solve practical problems: tracking a blood vessel in an angiographic image and identifying the brain and epicardial surfaces in MR images.

A. Finding a solitary edge

The segmentation of a 256×128 test pattern consisting of a semi-circle; both the semi-circle and the background had vertical intensity gradients running in opposite directions (FIG. 4a, upper panel). The objective was to identify the border of the circle. This experiment was designed to illustrate the general characteristics of the present inventive method.

In a realistic situation the energy function would be trained on a similar contour in another, previously-segmented image. However, in this illustrative example, the energy function was delivered from a contour which was drawn along the target edge itself (FIG. 4a, lower panel). The energy function depended on two extrinsic (image-derived) features of the contour: the intensities of the pixels on the inside and outside of each crack (or, equivalently, the gradient strength and average intensity at each crack). For the training contour, the histogram of these features consisted of a diagonal line segment in the feature space (FIG. 4b). This was convolved with a rectangular Parzen window to estimate the probability density distribution p (FIG. 4c).

Prior to annealing the energy (1-p) of each crack in the image was calculated and stored in a 2-D look-up table. The contour was initialized as a simple polygonal shape (left column of FIG. 8a) and allowed to evolve through the state space of all non-self-intersecting, open contours with endpoints fixed at the inferior border of the field of view. Annealing was carried out with the raindrop move generator and an exponential temperature schedule ($T_k = 0.75\ T_{k-1}$).

Figure 9:
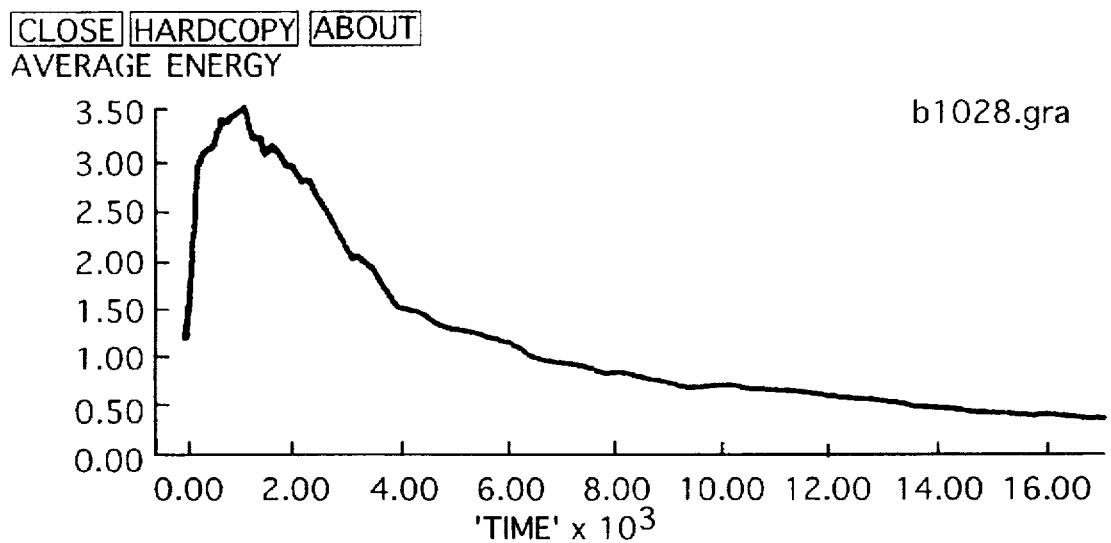
FIG. 9 graphically illustrates the evolution of the contour shown in the left column of FIG. 8 by plotting the running average of energy versus "time" (i.e. the number of attempted moves) where the system's energy is dramatically decreased as it is moved from a "melted" state to a "frozen" state.

The results are illustrated in FIG. 8, which shows the evolution of the contour from the initial state through "melted", "cooling", and "frozen" configurations. The behavior of the system is also depicted by a plot (FIG. 9) of the running average of the energy with respect to annealing "time" (number of attempted moves). The system started at a high energy corresponding to a poor initial configuration. As the temperature was lowered, the energy tended to decrease and fluctuations diminished. It required approximately 15,000 attempted moves for the system to reach the solution represented by the "frozen" state. Because of the rapidity of the annealing schedule in this case, the contour did not visit some pixels in the upper left corner of the field of view (FIG. 8g). This would have been problematical if portions of the target edge were located in this region.

B. Finding a globally optimal contour in an image with many locally optimal contours In the following example a 256×128 test pattern was used consisting of a set of concentric rings with varying intensities (center column of FIG. 8). The objective was to identify the brightest ring which had a peak intensity 40% higher than the others. This experiment was designed to test the ability of the present inventive method to deal with a state space characterized by numerous local minima, which were produced by the other bright rings.

Just as in the previous example, the energy function was derived from a contour which was drawn along the target ridge itself. The histogram of this training contour consisted of a single point (high intensity and low gradient) in the aforementioned 2-D feature space. The Parzen-estimated probability density distribution (p) had a single blurred peak. The contour was initialized along a straight line at the inferior border of the field of view. Then, using perturbations generated by the raindrop move generator, the contour was allowed to evolve in a state space consisting of all non-self-intersecting, open contours with end points fixed at the inferior border of the field of view.

The results are illustrated in FIG. 8, which shows the configurations of the "melted", "cooled", and "frozen" states of the contour. After approximately 15,000 attempted moves, the stochastic search successfully found the global minimum of the energy even though it encountered many local minima as the contour ranged over the field of view. Notice that in this example and all subsequent examples, the contour visited all pixels throughout the field of view (FIG. 8g), thereby increasing the likelihood of finding the target.

C. Identifying an object in the presence of ambiguous image data

Missing or ambiguous data are commonly observed in real images and often lead to the failure of region growing techniques. In order to determine how the present inventive method deals with this problem, it was tested on a 256×128 simulated image of an empty rectangular box that was degraded by missing fragments and a misleading line segment in the center (see right column of FIG. 8). The extraneous line segment had an intensity equal to 50% of the box.

As in the preceding two examples, the energy function was trained on the histogram of the cracks in the target contour itself. As in the previous example, this histogram was dominated by a single point in the 2-D feature space, and the probability density p had a blurred peak at the same location. The state space consisted of all non-self-intersecting, open contours which included two vertices fixed at the lower right corner of the box. The annealing process was initialized with a contour of this type, and the evolving contour was allowed to move freely over the whole field of view under the influence of the raindrop move generator.

The results are shown in FIG. 8, which depicts how the contour evolved through "melted", "cooled", and "frozen" phases. Notice that the final solution was reasonable, showing that the technique was stable in the face of edge discontinuities and extraneous edges. Such features often confound known segmentation techniques based on purely local criteria like connectivity as well as known state space search methods employing less robust optimization techniques.

D. Identification of the brain surface in MR images of the human head

There are several clinical applications which require delineation of the brain surface: 1) creation of 3-D renditions of the brain, which are useful for multimodality image display as well as for planning surgery and radiation therapy; this requires very accurate identification of the brain surface since the 3-D view of the brain's delicate gyral anatomy will be degraded even if only a few pixels are erroneously deleted or included; 2) brain volume measurements which can be used to detect or monitor certain disease processes.

The subjects consisted of normal adult volunteers as well as young adult patients with large unilateral cortical lesions. All subjects were imaged with a 1.5 Tesla whole body scanner (Magnetom, Siemens Medical Systems Inc., Iselin, N.J.). A volumetric gradient echo pulse sequence with TR/TE=40/11 msec and a flip angle of 40° produced T1-weighted images of 64 contiguous 3 mm sagittal sections. Each image was a 256×256 array of pixels over a 30 cm FOV.

Figures 10A, 10B, 10C, 10D:
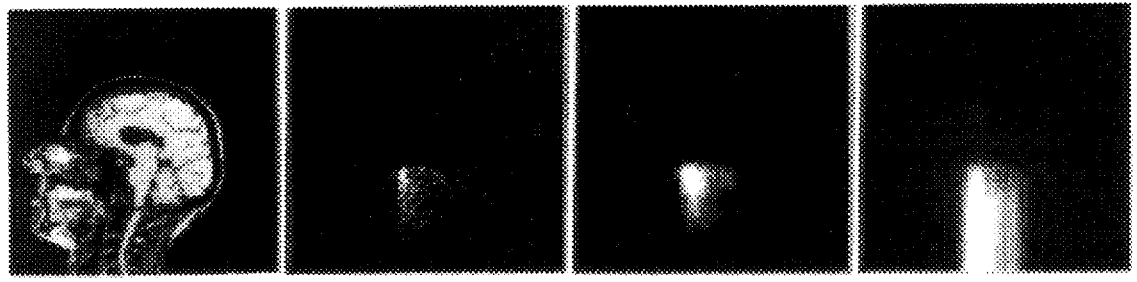

The operator initialized the segmentation process by using an interactive threshold-following program to find the brain contour in a "training" slice near the midline (FIG. 10a). As described previously, the energy of each crack was equated to 1-p where p was the probability density function of the cracks in this contour. This density function was derived by convolving the 2-D histogram (FIG. 10b) of the training cracks with a Parzen window (FIG. 10c). It is noted that (1-p) had a central "sink" for cracks resembling those in the training contour, but it had a "plateau" (i.e. was nearly equal to one) for cracks completely unlike those at the brain surface. When the evolving contour had strings of cracks in these areas of nearly constant energy, the annealing process tended to slow down since there was little energy change for almost all local contour movements within the plateau.

Therefore, the energy function was modified by adding a term (represented by the large concentric rings in FIG. 10d) which slowly decreased as a crack's features approached the average features of the training cracks. The density distribution was also extended into regions of feature space representing gradients greater than those of the training cracks (the area of streak-like blurring in FIG. 10d). This allowed the annealing process to form the brain contour from cracks representing even stronger edges than those in the training contour.

Starting from an arbitrary initial contour configuration, simulated annealing is theoretically capable of finding the "best" (i.e. energy-minimizing) contour among all possible contours in the image field of view. In practice, data representing higher level knowledge about the expected size, shape, and location of the desired contour was available. This information was used to reduce the size of the search space and thereby decrease the method's execution time. For example, an approximate template of the object to be segmented was used to create a narrow rim-like mask which was likely to contain the exact object contour. The contour optimization process was then limited to the much smaller state space of all contours within this mask.

It was relatively easy to incorporate this type of geometric information into the simulated annealing process, since it involved only simple, non-analytic calculations. In the case of MR head images, the training contour was dilated and eroded to create masks in the two adjacent slices on either side. The brain contour found by performing annealing within these masks was then used to find masks for even more lateral slices (Fig. 11a); in other words, slices were segmented automatically in a serial fashion, starting with the midline training slice and proceeding laterally in both directions.

For each slice, the contour was initialized in an arbitrary configuration within the mask. Then, annealing was performed with perturbations generated by the bike trail move generator. The annealing of each slice required the evaluation of 12,000 moves, which required 4 seconds of computing time on an Indigo 2 workstation (Silicon Graphics Inc.). Similar results were produced in 9 seconds using the raindrop move generator.

Figures 11A, 11B, 11C:
FIG. 11a pictorially represents an image of a rim-like mask containing an actual brain surface where the energy function shown in FIG. 10d was used to anneal the contour within the rim-like mask.
FIG. 11b pictorially represents an image of the head shown in FIG. 11a where the contour is shown in a melted state.
FIG. 11c pictorially represents the image of the head shown in FIG. 11a where the contour is shown in a frozen configuration.

FIGS. 11b and 11c show two stages in the annealing of a single slice. The contour was initially "melted" into a "fluid" state so that it roamed freely over the whole allowable search space (FIG. 11b). As the temperature of the system was slowly lowered, the contour "cooled" and finally "froze" in a configuration near the brain surface (FIG. 11c).

E. Segmentation of cardiac MR images

The diagnosis and treatment of heart disease requires the quantitative analysis of cardiac anatomy and function. Magnetic resonance imaging can be used to measure some of the important indices, including cardiac mass, wall-thickening, and ejection fraction. This requires the identification of the epicardial and endocardial borders of the left ventricle in a large number of dynamic images (e.g. 99 images, comprised of 9 adjacent cross-sections, each imaged at 11 phases of the cardiac cycle). Automatic or nearly automatic methods will be necessary to make this practical in a routine clinical setting. The present inventive method is used to successfully perform this task. It is particularly challenging to identify the epicardial surface because of the low contrast between the myocardium and adjacent liver/diaphragm and because of relatively large errors in cardiac images (e.g. motion artifact). These two features are particularly problematical for known segmentation techniques utilizing region-growing and other local criteria based on connectivity. The following paragraphs describe preliminary experiments in which the present inventive method was used to find the epicardial border.

Figures 12A, 12B, 12C:
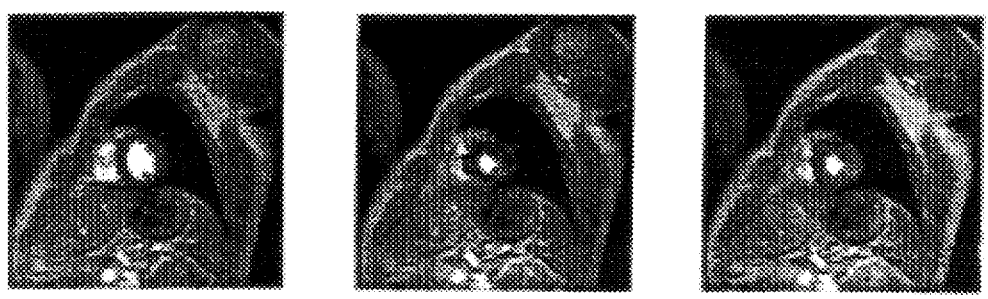
FIG. 12a pictorially represents an MR image of a human thorax particularly showing a training contour produced from a single diastolic cardiac image used to generate a non-parametric energy function.
FIG. 12b pictorially represents use of the energy function derived from FIG. 12a used to anneal the contour in other temporal images at the same location and at other locations, shown in a melted state.
FIG. 12c pictorially represents use of the energy function derived from FIG. 12a used to anneal the contour in other temporal images at the same location and at other locations, shown in a frozen configuration.

A 1.5 Tesla scanner (Signa, General Electric Medical Systems Inc., Milwaukee, Wis.) was used to acquire gated, short axis cardiac images of a normal adult, using a segmented k-space, "bright blood" gradient echo pulse sequence. Ninety-nine images were used depicting 9 cross-sections, each of which was imaged at 11 phases of the cardiac cycle. A user drew a "training" contour along the epicardial border in a single diastolic image of one cross-section (FIG. 12a). This contour was used to initiate the automatic, serial segmentation of the remaining 98 images.

First, a non-parametric energy function was derived from the 2-D histogram of these training cracks, as described previously. This energy function was then modified by adding heuristic terms which decreased the tendency of the contour to stray into areas of low signal intensity (e.g. lungs). By applying the procedure described above in section D entitled "identification of the brain surface in MR images of the human head," the training contour was also used to initialize the segmentation of the next temporal frame in the dynamic series of images of that cross-section.

First, the training contour was superimposed on that frame, and the procedure in Section D was applied to derive a rim-like mask, containing the epicardial border. Then, the contour was initialized in a random configuration within this mask, and annealing was applied with the above-described energy function. On the Indigo 2 workstation, the bike trail move generator produced an annealed state after 7700 attempted moves taking 4 sec of computation time. The raindrop move generator produced an annealed state after 9500 attempted moves taking 9 sec of computation time. The frozen contour was very close to the epicardial border in the new frame. The other frames in the temporal series at that location were then segmented in an automatic, serial fashion, with the annealed contour of one frame being used to derive the mask of the next frame.

The images of cross-sections at other spatial locations were also segmented automatically in the following manner. The first image in the temporal series at each location was segmented by using a mask derived from the annealed contour in the first frame of the adjacent, already-segmented cross-section. Then, the remaining images in the temporal series at the new location were segmented serially by using the annealed contour of each frame to derive a mask for the next frame. In this way, 98 cardiac images were segmented automatically, once the operator drew the training contour and derived the energy function for one image.

Approximately two-thirds of the images were segmented in an acceptably accurate fashion (e.g. FIGS. 12b,c). Thus, segmentation was possible despite the presence of motion artifacts, noise, and poor myocardial-hepatic contrast, which would severely hamper known techniques based on local criteria such as connectivity. One-third of the annealed contours contained short segments which deviated significantly from the epicardial border, often at the myocardial-hepatic interface. The number of such errors may be greatly reduced by using a more sophisticated energy function (e.g. incorporating smoothness and circularity of the cardiac contour, local texture characteristics, etc.). The present method should also benefit from future improvements in MR cardiac image quality which is currently problematical even for manual segmentation.

F. Tracking blood vessels in angiograms

Physicians would like to use angiograms to measure the luminal diameter of vessels as well as to create 3-D reconstructions of the vasculature. These applications require that the pertinent vessels be tracked and digitized. Since manual tracking is tedious and impractical in a clinical environment, investigators have attempted to develop automatic or semi-automatic methods. However, most of these known techniques are based on purely local criteria for vessel identification and suffer from errors due to noise, spurious vessel discontinuities, vessel branch points, and overlapping vessels. In the following experiment the feasibility of using the present inventive method to overcome these problems was tested.

Figure 13A:
FIG. 13a pictorially represents an image of a blood vessel in a cerebral angiogram where the region of interest contains a target vessel.

The intensity along the center-line of a vessel can vary significantly due to spatial variation of both the vessel's diameter and the concentration of contrast material (FIGS. 13a). Because of this phenomenon, the intensities of pixels adjacent to cracks, which were used as features in previous examples, have probability density functions which are poorly localized in feature space and are not suitable for use as energy functions. Therefore, an energy function dependent on local second derivatives of the image was used.

Figure 13B:
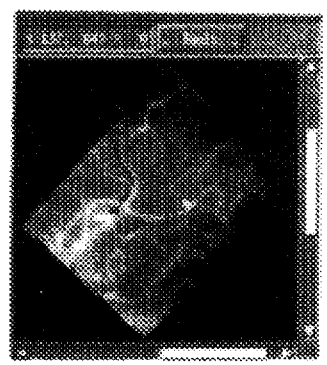
FIG. 13b pictorially represents an image of a training contour drawn on a typical vessel shown in FIG. 13a to generate a non-parametric energy function.

First, a processed image was created by convolving the original image with a Gaussian kernel and then taking the Laplacian derivative (LoG or "Mexican hat transform") . A training contour was drawn on a vessel that was different from the one which was to be tracked (FIG. 13b). The probability density function was found by computing the histogram of the training cracks in the corresponding processed image and then blurring this histogram with a Parzen window. This function was dominated by a localized cluster, representing pixels with negative intensities and small gradient values in the processed image; therefore, it was suitable for computing the crack energy function. The performance of the present method was further improved by introduction of a heuristic energy term that favored all cracks with aforementioned LoG characteristics (i.e. a small rectangular box of constant high probability located in the lower left quadrant of the crack histogram). The operator manually chose end points of the target vessel segment. The contour was then allowed to evolve in a state space consisting of all non-intersecting curves which connected those end points.

Figure 13C:
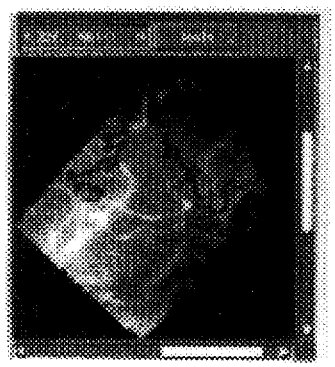
FIGS. 13c–13d pictorially represent images of the vessels shown in FIG. 13a where the energy function was used to anneal the contours of other vessels, transforming each contour from a melted state, as shown in FIG. 13c, into a frozen configuration, as shown in FIG. 13d.
Figure 13D:
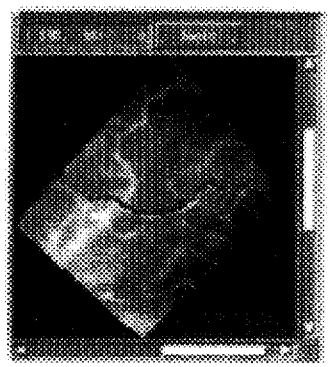

The results are displayed in FIGS. 13c and 13d which show the configurations of the "melted" and "frozen" states of the contour. Notice that the inventive method was not confused by noise, vessel discontinuities, and overlapping vessels which can be problematic for tracking techniques based on purely local criteria.

Further applications

The energy function can be improved by allowing it to depend on a variety of image characteristics in addition to those already considered (the average intensity and gradient across each crack). For example, as indicated, the energy can be "trained" on second derivatives and other types of local image features. It is also relatively straight-forward to let the energy depend on intrinsic geometric properties of the contour in addition to the above-mentioned image-derived quantities. For example, the energy function could be "trained" on measures of the local tortuosity, smoothness, circularity, or area of the curve. Finally, the energy function could be adapted to the characteristics of each cross-section by using an automatic, iterative method to re-derive it for each slice. This would allow the energy function to account for the spatial drifting of image intensity, caused by spatially inhomogeneous sensitivity of a scanner.

In the illustrated embodiment of the present inventive method, a purely 2-D method of segmentation is used; i.e. the segmentation of each cross-sectional image was not influenced by properties of the neighboring sections. In an alternative embodiment, this slice-by-slice method is modified so that the energy depended on combinations of image intensities in a 3-D neighborhood of each crack. Then, the segmentation of each slice would be influenced by the image intensities in neighboring sections as well as intensities in the cross-section of interest. In principle, the slice-by-slice approach could be performed using a completely 3-D method.

This could be done by performing a state space search for the optimal surface which circumscribes the object of interest. The energy of each voxel face would depend on the image intensities and the surface geometry in its 3-D neighborhood. The surface would be annealed by subjecting it to a series of deformations generated by merging it with single voxel "raindrops" or small closed surfaces. In such a truly 3-D approach, all cross-sectional images would be segmented in a simultaneous and completely correlated fashion.

Several aspects of the method are inherently parallelizable. For example, different slices can be processed simultaneously, as long as masks can be derived independently for each slice. Such masks can be generated by applying morphological operations to a 3-D brain template contained in a head "atlas", which has been registered with the scan volume. Alternatively, masks can be derived from an approximate brain surface created by another segmentation method (e.g. region growing). Finally, the annealing method itself can be parallelized in a way which may lead to super-linear increases in speed. For example, intra-slice parallelism can be realized by superposing multiple "bounding boxes" on the contour and simultaneously evaluating possible deformations in these regions.

Note that the present inventive method is not limited to segmenting anatomical images. The present inventive method can be applied to any type of image to identify contours. For example, the method can use images of an aircraft as a training object. In this case, a photograph or satellite reconnaissance image can be used to provide the target image or images. The present method is then used to identify selected aircraft within the target image to provide automatic identification of aircraft. Thus, a specific type of jet could be automatically identified in a satellite reconnaissance photograph.

Furthermore, images produced by any imaging system can be used to provide training objects and target deposits. For example, suitable imaging systems include, but are not limited to: MR scanners, CAT scanners, X-ray scanners, PET scanners, particle-beam imaging systems, radar systems, infra-red imaging systems, sonar systems, ultrasound scanners, photographic systems and camera imaging systems.

A specific embodiment of a method and apparatus for segmenting images using stochastically deformable contours according to the present invention has been described for the purpose of illustrating the manner in which the invention may be made and used. It should be understood that implementation of other variations and modifications of the invention and its various aspects will be apparent to those skilled in the art, and that the invention is not limited by the specific embodiments described. It is therefore contemplated to cover by the present invention any and all modifications, variations, or equivalents that fall within the true spirit and scope of the basic underlying principles disclosed and claimed herein.

What is claimed is:

1. A method for segmenting images by identifying the boundary of a target object, said boundary having a contour, the method comprising the steps of:

(a) selecting a plurality of training objects with contours having predetermined statistical properties in common with predetermined statistical properties of the contour of the target object;

(b) placing each said training object in a position to be scanned by an imaging system;

(c) scanning each of the training objects to obtain said predetermined statistical properties of the contours of the training objects;

(d) deriving an energy function from said predetermined statistical properties of the contours of the training objects;

(e) selecting a target object to be scanned and placing said target object in a position to be scanned by the imaging system;

(f) creating an initial evolving contour having an initial topology similar to a topology of the target object;

(g) calculating a value of the energy function of the evolving contour in a neighborhood of the target object, utilizing the predetermined statistical properties of the evolving contour;

(h) deforming the evolving contour by applying a deformation generator;

(i) calculating a value of the energy function of the evolving contour utilizing the predetermined statistical properties of the evolving contour in the neighborhood of the target object after the evolving contour has been deformed, said energy function having a low energy value when the statistical properties of the evolving contour are similar to the statistical properties of the contour of the training object, and having a high energy value when the statistical properties of the evolving contour are not similar to the statistical properties of the contour of the training object;

(j) comparing the value of the energy function of the evolving contour before and after the evolving contour has been deformed, respectively;

(k) accepting the deformations of the evolving contour if the value of the energy function after said deformation is lower than the value of the energy function before said deformation;

(l) determining whether to accept or reject the deformations of the evolving contour if the value of the energy function after said deformation is not lower than the value of the energy function before said deformation, said rejection of the deformations causing the deformations not to be merged into the evolving contour;

(m) merging said accepted deformations into the evolving contour;

(n) repeating steps (h)–(m) until less than a predetermined fraction of a predetermined number of deformations generated by said deformation generator are accepted; and (o) using the evolving contour to identify the boundary of the target object.

2. The method according to claim 1 wherein the predetermined statistical properties of the training objects represent image intensities of a plurality of pixels, said pixels being within a predetermined distance from the contour of the training objects.

3. The method according to claim 1 wherein the predetermined statistical properties of the evolving contour represent image intensities of a plurality of pixels, said pixels being within a predetermined distance from the evolving contour.

4. The method according to claim 1 wherein the predetermined statistical properties of the training objects and the evolving contour represent intrinsic geometric properties of the training objects and the evolving contour, respectively.

5. The method according to claim 4 wherein the intrinsic properties of the training objects and the evolving contour include properties selected from the group consisting of tortuosity, smoothness, circularity, shape and area enclosed by the contours.

6. The method according to claim 1 wherein the imaging system is selected from the group of imaging systems consisting of MR scanners, CAT scanners, X-ray scanners, PET scanners, particle-beam imaging systems, radar systems, infra-red systems, sonar systems, ultrasound scanners, photographic systems and camera imaging systems.

7. The method according to claim 1 wherein the step of obtaining said predetermined statistical properties of the training objects includes the step of creating a histogram representing image intensities of the plurality of pixels, said pixels being within a predetermined distance of the contour of the training objects.

8. The method according to claim 1 wherein the step of creating an initial evolving contour includes the step of randomly creating a closed contour if the target object is represented by a closed contour.

9. The method according to claim 1 wherein the step of creating an initial evolving contour includes the step of randomly creating a bounded line segment if the target object is represented by a line segment.

10. The method according to claim 1 wherein the step of deriving the energy function of the evolving contour includes the step of creating a histogram representing image intensities of the plurality of pixels defining the training object.

11. The method according to claim 10 wherein said predetermined distance is a single pixel distance.

12. The method according to claim 10 wherein said predetermined distance is less than a ten pixel distance.

13. The method according to claim 1 wherein the step of determining whether to accept or reject the deformations is performed according to a Boltzman function.

14. The method according to claim 1 wherein the step of determining whether to accept or reject the deformations is performed at a temperature selected between a predetermined high temperature and a predetermined low temperature, said temperature controlling a probability that the deformation is accepted.

15. The method according to claim 14 wherein the step of determining whether to accept or reject the deformations is initially performed at the high temperature.

16. The method according to claim 14 wherein the step of determining whether to accept or reject the deformations is iteratively performed as the temperature is lowered at a predetermined rate.

17. The method according to claim 14 wherein the step of determining whether to accept or reject the deformations performed at the high temperature permits about between 65% and 95% of the deformations to be accepted.

18. The method according to claim 17 wherein the step of determining whether to accept or reject the deformations performed at the high temperature permits about 80% of the deformations to be accepted.

19. The method according to claim 1 wherein the step of repeating steps (h)–(m) is performed such that said predetermined fraction of said predetermined number of deformations is less than about 5.0%.

20. The method according to claim 1 wherein the step of repeating steps (h)–(m) is performed such that said predetermined fraction of said predetermined number of deformations is less than about 0.5%.

21. The method according to claim 10 wherein the step of calculating the value of the energy function includes the step of creating a histogram representing image intensities of the plurality of pixels within an image of the target object, said plurality of pixels being within a predetermined distance from the evolving contour.

22. The method according to claim 14 wherein the step of determining whether to accept or reject the deformations is iteratively performed at a temperature that is lowered according to an exponential rate.

23. The method according to claim 1 wherein the step of applying the deformation generator includes the steps of:

(a) creating a crack diagram representing the evolving contour, each crack of said crack diagram representing an image pixel boundary in an image of the target object;

(b) selecting a crack along the evolving contour;

(c) defining a bounding area encompassing the selected crack and a portion of the evolving contour;

(d) determining locations of intersections where the evolving contour intersects the bounding area to define a starting point where the evolving contour enters the bounding area, and to define an ending point where the evolving contour exits the bounding area;

(e) depositing a predetermined number of single pixels within the bounding area, each said deposited pixel represented by four deposited bounding cracks in the crack diagram;

(f) assigning at least one of a first direction and a second direction to each deposited pixel, said assignment of the first direction defining a pixel region, said assignment of the second direction defining a pixel hole;

(g) traversing the crack diagram according to predetermined rules from the starting point to the ending point, and selecting deposited cracks connected to the evolving contour;

(h) modifying the evolving contour by merging the selected deposited cracks with the crack diagram representing the evolving contour to form an indentation in the evolving contour if the deposited pixels are defined to be pixel holes;

(i) modifying the evolving contour by merging the selected deposited cracks with the crack diagram representing the evolving contour to form an outcropping in the evolving contour if the deposited pixels are defined to be pixel regions; and (j) updating the crack diagram to represent the modified evolving contour.

24. The method according to claim 23 wherein each crack of the evolving contour represents a boundary between pixels of an image of the target object that border the evolving contour.

25. The method according to claim 23 wherein the step of selecting a crack along the evolving contour is performed according to a random function.

26. The method according to claim 23 wherein the step of depositing the predetermined number of single pixels includes the step of depositing about between one and six hundred single pixels.

27. The method according to claim 23 wherein the step of depositing the predetermined number of single pixels includes the step of depositing the single pixels within the bounding area according to a random function.

28. The method according to claim 23 wherein the step of assigning the first direction and second direction is made randomly according to a predetermined distribution.

29. The method according to claim 23 wherein the step of assigning the first direction and the second direction includes the step of assigning at least one of said first direction and said second direction to all of the predetermined number of single pixels.

30. The method according to claim 23 wherein the step of assigning the first direction and the second direction includes the step of assigning the first direction to a portion of the predetermined number of pixels and assigning the second direction to a remainder of the predetermined number of single pixels.

31. The method according to claim 23 wherein the predetermined rules for traversing the crack diagram permit said crack diagram to divide the target image into a connected outside region and a connected inside region.

32. The method according to claim 23 wherein the predetermined rules for traversing the crack diagram permit each crack of the crack diagram to be traversed only once, permit a continuous traversal path from said starting point to said ending point and prevent a self-intersecting traversal path.

33. The method according to claim 23 wherein the step of updating the crack diagram includes the step of eliminating cracks from the crack diagram that are not traversed.

34. The method according to claim 1 wherein the step of applying the deformation generator includes the steps of:

(a) creating a plurality of loop contours, each said loop contour defined by an perturbative crack array, the perturbative crack array having cracks, each said crack being connected to any other crack in the perturbative crack array by at least two different sets of connected cracks within the perturbative crack array;

(b) creating a crack diagram representing the evolving contour, each crack of said crack diagram representing an image pixel boundary in an image the target object;

(c) selecting a crack along the evolving contour;

(d) selecting at least one loop contour;

(e) depositing the at least one selected loop contour on the selected crack along the evolving contour;

(f) performing a logical OR operation to combine cracks of the crack diagram representing the evolving contour with the cracks of the perturbative crack array defining the loop contour;

(g) determining the location of the intersections where the evolving contour intersects the loop contour to define a starting point where the evolving contour enters the loop contour, and an ending point where the evolving contour exits the loop contour; and (h) traversing the crack diagram from the starting point to the ending point and updating the crack diagram according to predetermined rules to form an updated crack diagram such that the traversed cracks are merged into the evolving contour, said updated crack diagram representing a modified evolving contour.

35. The method according to claim 34 wherein the at least one loop contour is selected from a library of stored loop contours selected according to a random function.

36. The method according to claim 34 wherein the step of traversing the crack diagram includes the step of traversing the crack diagram according to one of at least first and second predetermined traversal rules, said traversal according to said first predetermined traversal rule forming an outcropping in the evolving contour, and said traversal according to said second predetermined traversal rule forming an indentation in the evolving contour.

37. The method according to claim 34 wherein the predetermined rules permit each crack of the crack diagram to be traversed only once, permit a continuous traversal path from the starting point to the ending point and prevent a self-intersecting traversal path.

38. A method for segmenting images by identifying the boundary of a target object, said boundary having a contour, said contour approximated by an evolving contour having an initial topology similar to a topology of the target object, the method comprising the steps of:

(a) creating a crack diagram representing the evolving contour, each crack of said crack diagram representing an image pixel boundary in an image of the target object;

(b) selecting a crack along the evolving contour;

(c) defining a bounding area encompassing the selected crack and a portion of the evolving contour;

(d) determining the location of the intersections where the evolving contour intersects the bounding area to define a starting point where the evolving contour enters the bounding area, and to define an ending point where the evolving contour exits the bounding area;

(e) depositing a predetermined number of single pixels within the bounding area, said deposited pixels represented by four deposited bounding cracks in the crack diagram;

(f) assigning at least one of a first direction and a second direction to each deposited pixel, said assignment of the first direction defining a pixel region, said assignment of the second direction defining a pixel hole;

(g) traversing the crack diagram according to predetermined rules from the starting point to the ending point, and selecting deposited cracks connected to the evolving contour;

(h) modifying the evolving contour by merging the selected deposited cracks with the crack diagram representing the evolving contour to form an indentation in the evolving contour if the deposited pixels are defined to be pixel holes;

(i) modifying the evolving contour by merging the selected deposited cracks with the crack diagram representing the evolving contour to form an outcropping in the evolving contour if the deposited pixels are defined to be pixel regions; and (j) updating the crack diagram to represent the modified evolving contour.

* * * * *

UNITED STATES PATENT AND TRADEMARK OFFICE
CERTIFICATE OF CORRECTION

PATENT NO. : 5,768,413
DATED : June 16, 1998
INVENTOR(S) : Levin et al.

It is certified that error appears in the above-indentified patent and that said Letters Patent is hereby corrected as shown below:

<u>Insert before the first line of the Specification:</u>

The U.S. government has rights in this invention pursuant to Contract/Grant Nos. CA51245 and CA56065 (E.I.R. No. 1413601-94-0022), awarded by the National Institutes of Health.

Signed and Sealed this

Sixth Day of April, 1999

Attest:

Q. TODD DICKINSON

*Attesting Officer*  *Acting Commissioner of Patents and Trademarks*